United States Patent
Badri et al.

(10) Patent No.: US 7,173,979 B1
(45) Date of Patent: Feb. 6, 2007

(54) METHOD AND DEVICE FOR TRANSMITTING INFORMATION SYMBOLS USING A PLURALITY OF CARRIERS AND METHOD AND DEVICE FOR RECEIVING INFORMATION SYMBOLS

(75) Inventors: Sabah Badri, Erlangen (DE); Ernst Eberlein, Grossenseebach (DE); Stephan Buchholz, Munich (DE); Stefan Lipp, Erlangen (DE); Albert Heuberger, Erlangen (DE); Heinz Gerhaeuser, Waischenfeld (DE)

(73) Assignee: Fraunhofer-Gesellschaft zur Foerderung der angewandten Forschung e.V., Munich (DE)

( * ) Notice: Subject to any disclaimer, the term of this patent is extended or adjusted under 35 U.S.C. 154(b) by 0 days.

(21) Appl. No.: 09/763,009

(22) PCT Filed: Apr. 15, 1999

(86) PCT No.: PCT/EP99/02752

§ 371 (c)(1),
(2), (4) Date: Apr. 4, 2001

(87) PCT Pub. No.: WO00/11844

PCT Pub. Date: Mar. 2, 2000

(30) Foreign Application Priority Data

Aug. 18, 1998 (DE) ................................ 198 37 426

(51) Int. Cl.
*H04L 27/20* (2006.01)

(52) U.S. Cl. ...................................... 375/308; 375/260

(58) Field of Classification Search ................ 375/308, 375/316, 346, 347, 295, 260, 259, 298, 329
See application file for complete search history.

(56) References Cited

U.S. PATENT DOCUMENTS 3,665,395 A    5/1972   Bochmann (Continued)

FOREIGN PATENT DOCUMENTS

DE           3785670           8/1993

(Continued)

OTHER PUBLICATIONS

U.S. Appl. No. 60/083,934, filed May 1998, Segal et al.*

(Continued)

*Primary Examiner*—Kevin Burd
(74) *Attorney, Agent, or Firm*—Michael A. Glenn; Glenn Patent Group

(57) ABSTRACT

The invention relates to a method and a device for transmitting information symbols using a plurality of carriers, wherein a first transmission symbol is produced (52, 54) on the basis of an information symbol. A second transmission symbol is also produced (52, 54) on the basis of the same information symbol, wherein the second transmission symbol differs from the first transmission symbol. The first and second transmission symbols are modulated (56) on a carrier and transmitted (62) at different intervals. The invention further relates to a method and a device for receiving information symbols represented by the first and second information symbols, wherein both transmission symbols received are used in order to extract the information symbol contained in both transmission symbols.

35 Claims, 6 Drawing Sheets

U.S. PATENT DOCUMENTS

| | | | | |
|---|---|---|---|---|
| 3,755,628 | A | * | 8/1973 | Games et al. ................ 370/445 |
| 4,606,047 | A | | 8/1986 | Wilkinson |
| 5,652,764 | A | * | 7/1997 | Kanzaki et al. ............. 375/130 |
| 5,881,108 | A | * | 3/1999 | Herzberg et al. ........... 375/296 |
| 6,647,069 | B1 | * | 11/2003 | Segal et al. ................. 375/278 |

FOREIGN PATENT DOCUMENTS

| | | |
|---|---|---|
| DE | 195 32 959 A | 2/1997 |
| EP | 0 572 171 A | 12/1993 |
| GB | 2 291 314 A | 1/1996 |
| JP | 05-327807 | 10/1993 |
| JP | 10-032557 | 3/1998 |
| WO | WO94/09573 A1 | 4/1994 |
| WO | WO96/01535 A1 | 1/1996 |

OTHER PUBLICATIONS

U.S. Appl. No. 60/083,952, filed May 1998, Segal et al.*

Ungerboeck, gottfried, "Channel Coding with Multilevel/Phase Signals", pp. 55-66. IEEE Transaction on Information Theory, vol. IT-28, No. 1 Jan. 1982.

Weinstein, S.B., et al., "Data Transmittion by Frequency-Division Multiplexing Using the Discrete Fourier Transform", pp. 628-634, IEEE Transactions on Communication Technology, vol. 1. COM-19, No. 5, Oct. 1971.

Zou, William Y., et al. "COFDM: An Overview", pp. 1-8, IEEE Transactions on Broadcasting, vol. 41, No. 1, Mar. 1995.

European Telecommunication Standard ETS 300 744, Mar. 1997.

May, Thomas, et al., "Performance Analysis of Viterbi Decoding for 64-DAPSK and 64-QAM Modulated OFDM Signals" pp. 182-190, IEEE Transactions of Communication, vol. 46, No. 2, Feb. 1998.

Fischer, Robert, "Calculation of Soft-Output in Differential Phase Modulation", pp. 9-16, Lehrstuhl fur Nachrichtentechnik II, Universitat Erlangen-Nurnberg.

* cited by examiner

METHOD AND DEVICE FOR TRANSMITTING INFORMATION SYMBOLS USING A PLURALITY OF CARRIERS AND METHOD AND DEVICE FOR RECEIVING INFORMATION SYMBOLS

FIELD OF THE INVENTION

The present invention relates to systems for digital broadcasting, and in particular to systems for digital broadcasting which guarantee reliable reception in spite of changing transmission channels with respect to frequency and time.

BACKGROUND OF THE INVENTION AND PRIOR ART

Satellite-supported broadcasting systems provide adequate basic coverage only in rural areas. Therefore, in densely built-up areas, where the reception from satellites is not perfect, terrestrial "re-broadcasting" must be carried out in addition. This means that the satellite signal is received and converted from a fixed receiver directed at the satellite, and is then re-broadcasted from a terrestrial transmitter. Signals from this terrestrial transmitter can then be received by mobile receivers, such as car radios.

For digital broadcasting, pieces of music or speech sequences can be coded, for example, in accordance with ISO MPEG Layer 3. Such reduced redundancy coding limits the considerable quantity of digital information to be transmitted. For example, an MPEG-coded piece is preferably channel-coded in the transmitter, in order to achieve a certain degree of freedom from errors right from the start. Algorithms for error protection include, for example, a Reed-Solomon code and a convolution code. For decoding the convolution code in the receiver symbol-by-symbol MAP is usually used, or the Viterbi algorithm, which works according to the principle of maximum likelihood estimation.

For terrestrial re-broadcasting, larger cities are preferably served by a so-called single frequency network (SFN=Single Frequency Network). This means that areas which cannot be covered by a single transmitter are re-transmitted by means of several transmitters, which transmit the identical signal synchronously.

Implementation of an SFN, as well as error protection codings in the transmitter and the corresponding decodings in the receiver, are well known to experts in this field. With regard to different channel coding possibilities, reference is made to "Channel Coding With Multilevel/Phase Signals" by Gottfried Ungerboeck, IEEE Transactions on Information Theory, volume IT-28, no. 1, pages 55-66, January 1982.

In systems of this type, Multi-Carrier-Modulation (MCM) can be used as the modulation. Multi-Carrier-Modulation can be implemented, for example, by a so-called OFDM-modulation (OFDM=Orthogonal Frequency Division Multiplex).

In OFDM-modulation an OFDM symbol is first formed from a section or block of an input bit sequence. For this, a bit sequence is represented on another sequence of numbers. This type of representation is also known technically as "mapping". In the simplest case mapping means the combination of two sequential bits of the input sequence in order to obtain a dibit, i.e. a digital word of length two bits. Depending on the number of carriers present, as many digital words are now stored in parallel as there are carriers present. This parallel arrangement corresponds to the formation of a complex spectrum, wherein each digital word (i.e. each dibit in the example) is a complex representation of one carrier for a plurality of carriers. In order to transmit this spectrum, it is transformed into the time domain by means of an inverse Fourier transform, which is produced as a Discrete Fourier Transform (DFT) or as a Fast Fourier Transform (FFT).

The result of the transform of one spectrum from a large number of dibits or information symbols is also known as an MCM-symbol. This MCM-symbol can preferably be extended by one protection interval in the time domain, so that no Inter Symbol Interference (ISS) occurs. Several MCM symbols, between each of which a guard or protection interval is inserted, can be combined to form an MCM frame, which is provided with a synchronisation sequence for synchronisation of the receiver. The MCM frame thus consists of several MCM-symbols, between each of which there is a protection interval, and a synchronisation sequence. Timing of the protection interval should be sufficiently long that, in an SFN system, repeated reception from transmitters other than the nearest located transmitter, which all transmit synchronously at the same frequency, does not lead to loss of data.

With regard to OFDM modulation, reference is made, for example, to the scientific publication "Data Transmission by Frequency-Division Multiplexing Using the Discrete Fourier Transform", by S. B. Weinstein et al., IEEE Transactions on Communication Technology, volume COM-19, no. 5, pages 628–634, October 1971. With regard to OFDM with channel coding, reference is made, for example, to the scientific publication "COFDM: An Overview" by William Y. Zou et al., IEEE Transactions on Broadcasting, volume 41, no. 1, pages 1-8, March 1995.

The principles of OFDM and channel coding for the OFDM by means of convolution codes, and channel decoding by means of the Viterbi algorithm are well known, and have been described in detail in the publications mentioned. It is therefore not necessary to explain these aspects in detail here. One problem with multi-carrier transmission systems (CM), which also include the OFDM systems, is the fact that during transmission of information over multiple channels many carriers can be (almost) completely subject to fading. Information which is transmitted by means of these carriers is therefore no longer available to the receiver, and can only be recovered (if at all) by efficient channel coding.

Interference of the non-ideal transmission channel can consist, for example, of Additive White Gaussian Noise (AWGN), a time-dependent increased damping of the transmission channel (for example, when driving in the "shadow" of a high-rise building), a frequency-selective transmission channel, i.e. certain frequencies are more strongly damped than other frequencies, or (usually) a combination of the phenomena mentioned. Furthermore, owing to the highly inhomogeneous topology of the transmission channel, i.e. the many buildings in a city, reflections can also take place. As has already been mentioned, under corresponding running time conditions, these lead to constructive, but also to destructive, interferences. This situation becomes more aggravated owing to the fact that, in addition to the multi-channel reception (which exists owing to the different transmission paths), in an SFN-system system-related signals from other transmitters are received, which transmit in synchronisation with a transmitter which is dominant in relation to the receiver. Signals for such broadcast relay transmitters will have longer times of travel to the receiver; however, owing to constructive interferences it is quite possible that their amplitudes will come within the range of the receiver amplitude of the dominating transmitter, particularly if this, for its part, is strongly damped by a destructive interference.

U.S. Pat. No. 4,606,047 relates to a RF communication modem using frequency as well as time diversity for eliminating transmission problems like noise, multiple path transmission etc. A digitally coded signal is sequentially transmitted in five complementary dual tone channels, wherein the first tone of a channel, i.e., the first carrier of a channel carries the actual bit to be transmitted, while the second tone of the channel transmits the complementary state of the first channel. In each channel, the transmit bit and the complementary bit are transmitted simultaneously, wherein the transmission in the five channels takes place in a time staggered manner.

EP 0 572 171 A1 relates to a method and apparatus for providing time diversity for channels, that are affected by multiple path fading. A digital signal is channel-coded to generate one or more symbols. Then, a plurality of symbol copies is made, wherein each copy is weighted by a fixed time-varying function. The weighted symbol copies are processed by means of different transmitting circuits and transmitted by means of antennas connected to respective transmitting circuits. The weighting of the symbols by means of the time-varying function includes changing the amplitude amplification, the phase shift or the amplitude amplification and the phase shift. The weighted copies of a symbol are transmitted simultaneously. So called "deep fades" are overcome by the fact that the weighting using the time-varying signal introduces different phase/amplitude situations. Although, also in this situation, a destructive interference can occur because of the weighting, the interfering signals are changed such that the "deep fades" are no longer "stationary", but only occur during a certain portion of the time-varying weighting functions.

SUMMARY OF THE INVENTION

The object of the invention described here is to create a concept for digital broadcasting, which ensures error-free transmission, even if there is interference in the transmission channel.

In accordance with a first aspect of the present invention, this object has been achieved by a method for transmitting information symbols using a plurality of carriers, the method comprising the following steps: generating a first transmission symbol from an information symbol; generating a second transmission symbol from the same information symbol, the second transmission symbol being different to the first transmission symbol, wherein from each information symbol at least two transmission symbols differing from each other can be generated, these being clearly allocated to this information symbol, and wherein all transmission symbols, which can be generated from the individual transmission symbols differ from each other and from the information symbols; modulating the first transmission symbol on a carrier, and transmitting the carrier modulated with the first transmission symbol at a first time; and modulating the second transmission symbol on a carrier, and transmitting the carrier modulated with the second transmission symbol at a second time, the second time being after the first time.

In accordance with a second aspect of the present invention, this object has been achieved by a method for transmitting information symbols using a plurality of carriers, comprising the following steps: generating a first transmission symbol from an information symbol; generating a second transmission symbol from the same information symbol, the second transmission symbol being different to the first transmission symbol, wherein from each information symbol at least two transmission symbols differing from each other can be generated, these being clearly allocated to this information symbol, and wherein all transmission symbols, which can be generated from the individual transmission symbols differ from each other and from the information symbols; generating a difference between the first transmission symbol and a transmission symbol preceding the first transmission symbol in time, in order to obtain a first differential symbol; generating a difference between the second transmission symbol and a transmission symbol preceding the second transmission symbol in time, in order to obtain a second differential symbol; modulating the first differential symbol on a carrier, and transmitting the carrier modulated with the first differential symbol at the first time; and modulating the second differential symbol on a carrier, and transmitting the carrier modulated with the second differential symbol at a second time, the second time being after the first time.

In accordance with a third aspect of the present invention, this object has been achieved by a method for receiving information symbols transmitted by means of a plurality of carriers, wherein an information symbol is represented by a first transmission symbol and a second different transmission symbol, which are received at different times, wherein from each information symbol at least two transmission symbols differing from each other can be generated, these being clearly allocated to this information symbol, and wherein all transmission symbols, which can be generated from the individual transmission symbols differ from each other and from the information symbols, comprising the following steps: demodulating a first carrier, in order to obtain the first received transmission symbol at a time; storing the first received transmission symbol, or of information which refers to the first received transmission symbol; demodulating a further carrier at a second time, in order to obtain a second received transmission symbol, and using the stored first received transmission symbol or the information which refers to the first received transmission symbol and the second received transmission symbol, in order to determine the information symbol, on which the two received transmission symbols are based, by ascertaining to which information symbol from the information symbols the first received transmission symbol und the second received transmission symbol being different from the first received transmission symbol are allocated.

In accordance with a fourth aspect of the present invention, this object has been achieved by an apparatus for transmission of information symbols by means of a plurality of carriers, comprising: means for generating a first and a second transmission symbol, based on s single information symbol, wherein the first and second transmission symbols differ from one another, wherein from each information symbol at least two transmission symbols differing from each other can be generated, these being clearly allocated to this information symbol, and wherein all transmission symbols, which can be generated from the individual transmission symbols differ from each other and from the information symbols; means for modulating the first and second transmission symbols on a first and second carrier; and means for transmitting the modulated first transmission symbol at a first time, and the modulated second transmission symbol at a second time, wherein the second time is after the first time.

In accordance with a fifth aspect of the present invention, this object has been achieved by an apparatus for the reception of information symbols, which are transmitted by means of a plurality of carriers, wherein an information symbol is represented by a first and a second transmission symbol, each being different from the other, which are received at different times, comprising: means for demodulating the modulated carriers at respective times, in order to obtain a first and second received transmission symbol, and means for using the two received transmission symbols, in order to determine the information symbol on which the two received transmission symbols are based, by ascertaining to which information symbol from the information symbols the first received transmission symbol und the second received transmission symbol being different from the first received transmission symbol are allocated.

The present invention is based on the realisation that information can be protected by transmitting it two or more times. If a carrier is subject to strong interference at a certain time, or has even been erased, there is still a possibility of recovering the same information from this carrier at a later time if the information is retransmitted at a later time or at several later points in time. The concept according to the invention works most efficiently if the information, when transmitted for the second time, is retransmitted not by means of the same carrier, but via a different carrier. The reason for this is that if the channel interference is not just of a temporary nature, but is a destructive interference of certain carriers, of longer duration, the disturbed information in the carriers, which has almost been erased, can be recovered by other carriers, which have not been disturbed or may even have been reinforced by constructive interference. This leads to a "diversity effect". According to the invention, this diversity is achieved by an enlargement of the signal constellation, and for this reason it is called "mapping diversity". If, for example, a QPSK, i.e. quaternary phase shift-keying, is considered, the signal constellation will consist of four different phase values, by means of which information can be transmitted. In QPSK each phase pointer has the same amplitude, which can be, for example, 1 or 1.41 (magnitude of real part=magnitude of imaginary part=1). As will be described in more detail later, an enlargement of the signal constellation according to the present invention, leads to weighting of the amplitude of a pointer, i.e. the first transmission symbol based on the first information symbol has the first amplitude, while the second transmission symbol, which is based on the same information symbol, but which is transmitted at a later time, has a different amplitude. Therefore, according to the invention, the information is not only transmitted twice, but also by means of different information symbols, which are in the enlarged signal constellation. However, since no useful information is coded in the difference between the transmission symbols, the bit band width of the system is not increased through this method.

According to the invention, a receiver, to which the enlarged signal constellation is also known, can reliably recover the transmitted information symbols by means of channel decoding. This is possible on the basis of the two transmission symbols received at different times, which are related to the same information symbol, and owing to the difference in the transmission symbols received.

The preferred type of modulation is differential phase shift-keying, which, in principle, can be implemented with any number of phase states (DMPSK), but which, in a preferred application is implemented as DQPSK, i.e. with four phase states or phase pointer positions. For coherent reception the phase is estimated for each information symbol received. Differential decoding, i.e. forming the phase difference between two successively received transmission symbols, can be carried out by simple subtraction. The disadvantage of this concept is increased hardware complexity for phase estimation. The advantage is, however, a higher reception gain.

Incoherent reception does not require phase estimation and therefore the hardware is simpler. However, with non-mobile reception, the reception gain is about 3 dB less than for the coherent receiver. In this case, differential-decoding is carried out by multiplying the transmission symbol currently received by the complex conjugate of the transmission symbol last received. In the case of mobile reception, the reception gain is less, since the phases, for example owing to Doppler displacements, cannot be estimated so accurately. The result of this complex multiplication is produced by multiplication of the magnitudes, and subtraction of the phases of the two multiplicands. The useful information required is contained in the phase difference. However, for channel decoding in the receiver, the amplitude of this multiplication result is also required. Since two small amplitudes are multiplied by one another, the amplitude of the result is typically an even smaller number. However, as can be seen from a consideration of the signal constellation, small amplitudes lead to more and more unreliable decisions. Therefore, according to the invention, no hard decision making is carried out, but instead a "soft" decision is made, by means of the so-called "Log-Likelihood Ratios", in order to increase the decoder reliability.

BRIEF DESCRIPTION OF THE DRAWINGS

Preferred embodiments of the present invention are described in more detail below, with reference to the enclosed drawings, in which.

DETAILED DESCRIPTION OF PREFERRED EMBODIMENTS

For derivation of the signal constellation according to the invention, reference will be made below to FIG. 3, which shows a signal constellation diagram for representing a common QPSK or DQPSK mapping (DQPSK=Differential Quaternary Phase Shift Keying). The signal constellation diagram includes four phase states, which can be represented by two bits, b(1) and b(0). From FIG. 3 it can be seen that the binary word 00 corresponds to a phase of 0 degrees, that the binary word 01 corresponds to a phase of 90 degrees ($\pi/2$), that the binary word 11 corresponds to a phase of 180 degrees ($\pi$) and that the binary word 10 corresponds to a phase of 270 degrees (3/2 $\pi$). From this it can be seen that in FIG. 3, as in the entire present application, a clockwise angular turning convention is used. This is contrary to trigonometric angular turning, which, as is well known, is directed counter-clockwise.

Figure 3:
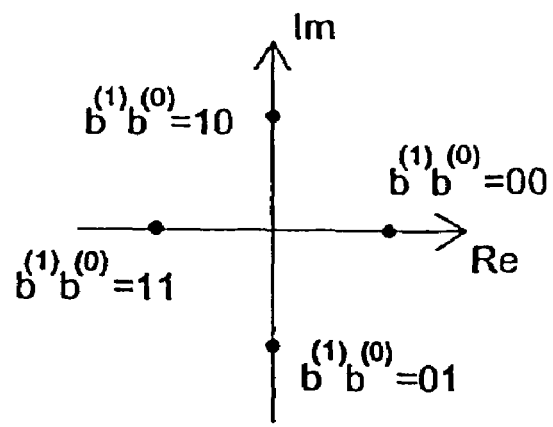
FIG. 3 is a signal constellation diagram for normal phase shift-keying or differential phase shift-keying.

The signal constellation diagram of FIG. 3 can be used both for normal phase shift-keying and for differential phase shift-keying.

Figure 4:
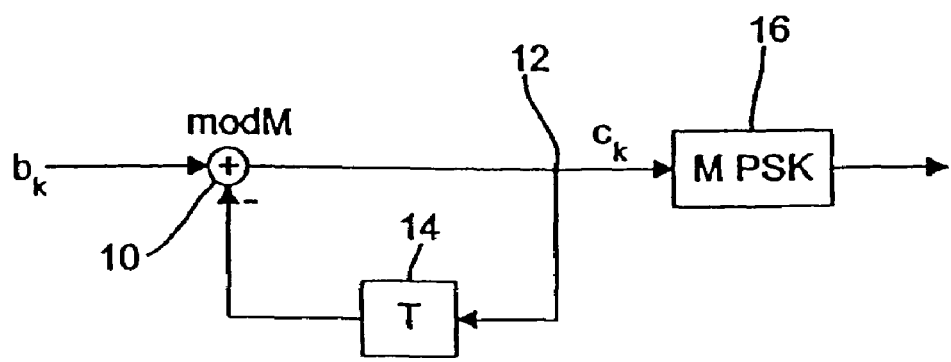
FIG. 4 is a basic circuit diagram for phase shift-keying with differential coding.

FIG. 4 shows a basic circuit diagram for implementing differential phase shift-keying with a number M of phase states (PPSK). A digital word $b_k$ at time k, which in the general case can have any number of bits, but which in the implementation described here has only two bits (in order to be able to represent the phase states shown in FIG. 3), is fed into a summer 10, which is designed as a ModM summer. This means that the output signal of the summer always gives a phase which is smaller that 360 degrees. Connected after the summer is a branch point 12, at which the signal $b_k$ at time k is branched off and fed into a delaying device T 14, where $b_k$ is delayed by one period. In the next cycle a new $b_k$ is fed into the summer 10 and the $b_k$ of the last cycle, which is now designated as $b_{k-1}$, is subtracted from $b_k$ in order to obtain the differential phase, which is designated as $c_k$. $c_k$ is thus a binary word with any number of bits, the number of which corresponds to the bit number of $b_k$, wherein this bit word $c_k$ is now allocated to a phase value in block MPSK 16. Although one refers to "phases" for the symbols $b_k$ or $b_{k-1}$ or $c_k$, these symbols represent only bit words for which certain phase values will be allocated by the block MPSK 16.

Figure 1:
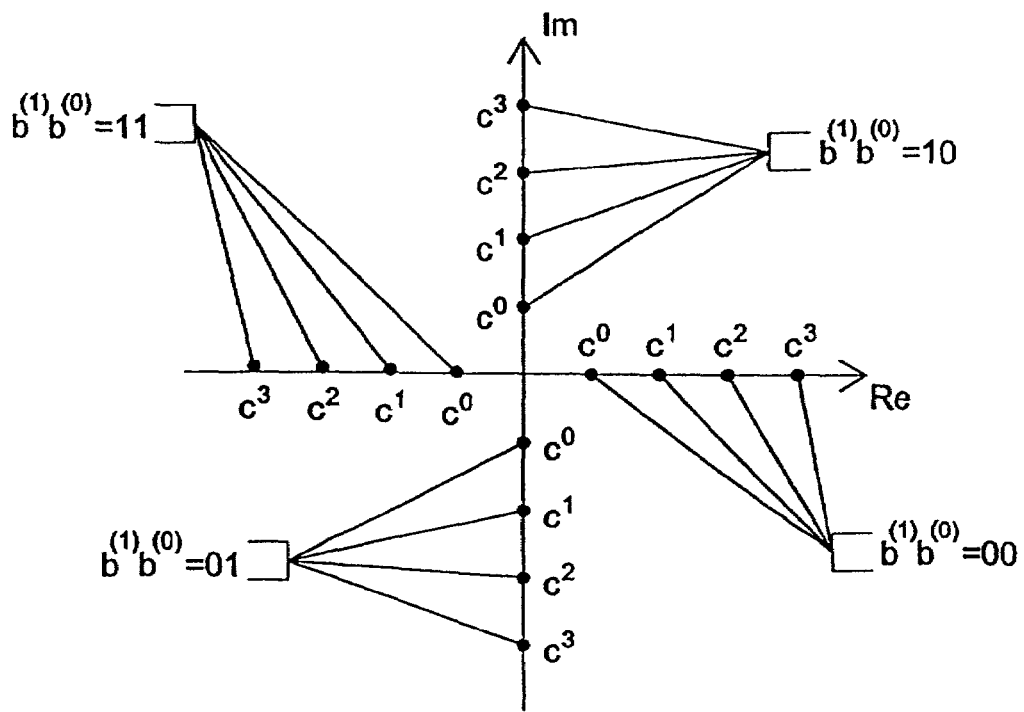
FIG. 1 is a signal constellation diagram of an example of an enlarged signal constellation, according to the invention.

In the following section reference is made to FIG. 1, which represents an enlarged signal constellation according to the invention. Each symbol b(1) b(0) is weighted by four possible amplitude factors c(i), i from {0, 1, 2, 3}. This gives a total of 16 possibilities for the signal constellation, which is shown in FIG. 1. This signal constellation is similar to a differential amplitude and phase modulation (DAPSK), but differs from a genuine DAPSK in that no useful information is transmitted through the amplitude factors c(i), but that through different amplitude weightings c(i) different transmission symbols are produced, which, however, all have the same useful information, represented by b(1) b(0). Table 1 below shows the different possibilities.

TABLE 1

| $c^{(i)}b^{(1)}b^{(0)}$, $\varphi = 0$ | $c^{(i)}b^{(1)}b^{(0)}$, $\varphi = \frac{\pi}{2}$ | $c^{(i)}b^{(1)}b^{(0)}$, $\varphi = \pi$ | $c^{(i)}b^{(1)}b^{(0)}$, $\varphi = \frac{3\pi}{2}$ |
|---|---|---|---|
| $c^{(0)}$ 00 | $c^{(0)}$ 10 | $c^{(0)}$ 11 | $c^{(0)}$ 01 |
| $c^{(1)}$ 00 | $c^{(1)}$ 10 | $c^{(1)}$ 11 | $c^{(1)}$ 01 |
| $c^{(2)}$ 00 | $c^{(2)}$ 10 | $c^{(2)}$ 11 | $c^{(2)}$ 01 |
| $c^{(3)}$ 00 | $c^{(3)}$ 10 | $c^{(3)}$ 11 | $c^{(3)}$ 01 |

Figure 2:
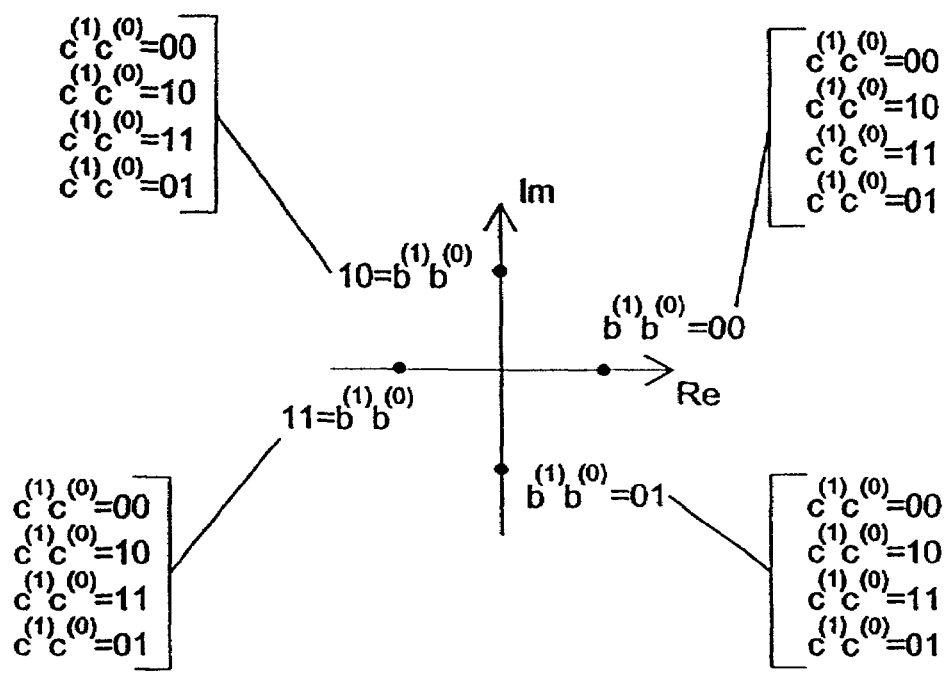
FIG. 2 is a signal constellation diagram of a further example of an enlarged signal constellation, according to the invention.

FIG. 2 shows a further example of an enlargement of the signal constellation according to the invention. Each symbol (b(1), b(0)) is weighed with four possible symbols (c(1), c(0)) {(00), (01), (11), (10)}. This gives the following possibilities for the individual information symbols b(1) b(0):

| $(b^{(1)} b^{(0)}) = \{00\}$ | | | |
|---|---|---|---|
| $(b^{(1)} b^{(0)} c^{(1)} c^{(0)})$ | $(b^{(1)} b^{(0)} c^{(1)} c^{(0)})$ | $(b^{(1)} b^{(0)} c^{(1)} c^{(0)})$ | $(b^{(1)} b^{(0)} c^{(1)} c^{(0)})$ |
| 0000 | 0010 | 0011 | 0001 |
| $\{b^{(1)} b^{(0)}\} = \{01\}$ | | | |
| $(b^{(1)} b^{(0)} c^{(1)} c^{(0)})$ | $(b^{(1)} b^{(0)} c^{(1)} c^{(0)})$ | $(b^{(1)} b^{(0)} c^{(1)} c^{(0)})$ | $(b^{(1)} b^{(0)} c^{(1)} c^{(0)})$ |
| 0100 | 0110 | 0111 | 0101 |
| $\{b^{(1)} b^{(0)}\} = \{11\}$ | | | |
| $(b^{(1)} b^{(0)} c^{(1)} c^{(0)})$ | $(b^{(1)} b^{(0)} c^{(1)} c^{(0)})$ | $(b^{(1)} b^{(0)} c^{(1)} c^{(0)})$ | $(b^{(1)} b^{(0)} c^{(1)} c^{(0)})$ |
| 1100 | 1110 | 1111 | 1101 |
| $\{b^{(1)} b^{(0)}\} = \{10\}$ | | | |
| $(b^{(1)} b^{(0)} c^{(1)} c^{(0)})$ | $(b^{(1)} b^{(0)} c^{(1)} c^{(0)})$ | $(b^{(1)} b^{(0)} c^{(1)} c^{(0)})$ | $(b^{(1)} b^{(0)} c^{(1)} c^{(0)})$ |
| 1000 | 1010 | 1011 | 1001 |

In the table below these results are summarised again. It can be seen that the four possibilities for phase coding have been extended to 16 possibilities through the information symbol, which exhibits two bits b(1) b(0).

TABLE 2

| $(b^{(1)} b^{(0)} c^{(1)} c^{(0)})$ | $(b^{(1)} b^{(0)} c^{(1)} c^{(0)})$ | $(b^{(1)} b^{(0)} c^{(1)} c^{(0)})$ | $(b^{(1)} b^{(0)} c^{(1)} c^{(0)})$ |
|---|---|---|---|
| 0000 | 0010 | 0011 | 0001 |
| 1000 | 1010 | 1011 | 1001 |
| 1100 | 1110 | 1111 | 1101 |
| 0100 | 0110 | 0111 | 0101 |

At this stage it should be pointed out that enlargement of the signal constellation according to the invention is not limited to differential phase shift-keying, but that any kind of modulation method, e.g. quadrature amplitude modulation (QAM), phase shift-keying (PSK), amplitude phase shift-keying (APSK) or differential amplitude shift-keying (DAPSK) can be extended according to the invention. This takes place in such a way that a second transmission symbol can be generated, based on an information symbol, the second transmission symbol differing from the first transmission symbol, but which is also related to the same information symbol as the first transmission symbol. The important thing is that this enlargement of the signal constellation is not used to transmit more information, but to transmit the same information at least once more. Referring to FIG. 1, this means that no useful information is contained in the different amplitudes, which can be generated through the different weighting factors c(i). The different amplitudes are used by the channel decoding in order to be able to make reliable bit decisions. Contrary to the case when re-transmitting two identical information symbols, this enlarged signal constellation according to the invention, permits, for example, differentiation of two transmission symbols at the receiver. In general terms the enlarged signal constellation according to the invention provides flexibility with regard to the design of transmission symbols. In the method according to the invention only the bits of the information symbols are further used for transmitting useful information. Therefore the transmission band width of the system is not impaired.

Figure 5:
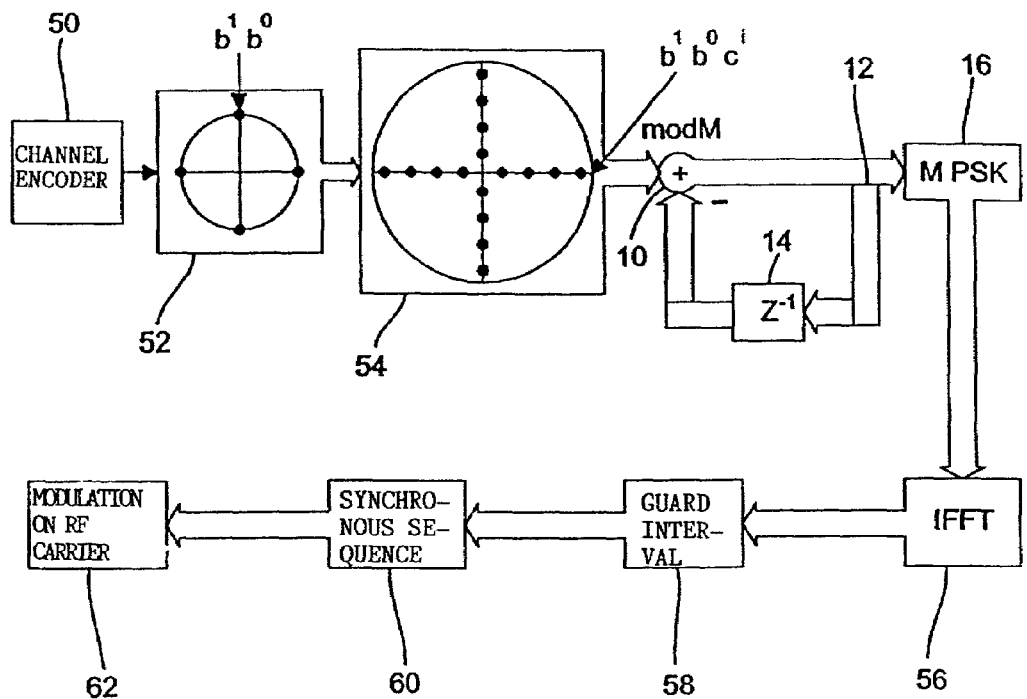
FIG. 5 is a transmitter for information symbols in accordance with a preferred embodiment of the present invention.

FIG. 5 shows a block diagram of a preferred embodiment of a transmitter according to the invention. A channel coder 50 carries out well-known, state of the art channel coding processes, which are based on a convolution or similar code, and supplies bits to the first device 52 for grouping bits, in order to generate information symbols b(1) b(0). Through the grouping of two bits b(1) b(0) it is possible to represent the four phase states of the signal constellation diagram shown in FIG. 3. The device for grouping of bits, in order to generate information symbols, is also known as the "first mapper". Connected after the first mapper 52 is a second mapper 54, which implements the enlargement of the signal constellation according to the invention to give an enlarged signal constellation as shown in FIG. 1. The second "mapper" can, of course, also implement the enlarged signal constellation, which is represented in FIG. 3. The second mapper 54 thus represents a device for weighting the information symbols which have been generated from device 52 for grouping. Thus both devices, 52 and 54, together represent one device for generating a first and second transmission symbols based on one single information symbol, wherein the first and second transmission symbols differ from one another. Both information symbols are weighted by the weighting device 54 using two different factors c(i). Thus at the output of the device for weighting 54 there are different transmission symbols at different times, but which are related to the same information symbol b(1) b(0).

In a preferred embodiment of the present invention, differential coding of two transmission symbols, which are adjacent in time (such as has already been described with reference to FIG. 4), is carried out. It is obvious, however, that the method of transmission according to the invention, just as the method of receiving according to the invention, can also be carried out without differential coding, wherein in this case the elements 10, 12 and 14 are not present.

In the implementation of the invention, multi-carrier modulation with 512 carriers is used. As already mentioned at the beginning, this multi-carrier modulation is brought about by an inverse Fourier transform, which is symbolically represented by block IFFT, 56, in FIG. 5. In addition the devices 50 to 54, and 10 to 16, generate 512 transmission symbols or differential symbols, which are then transformed into the time domain by means of block IFFT, in order to obtain an MCM symbol, which is outputted at the output of block IFFT, 56. In order to avoid interference of two neighbouring MCM symbols when using an SFN system, a protection interval or guard interval is inserted between each MCM symbol, as is symbolically represented by block 58. In order to create a complete MCM frame after a certain number of MCM symbols, between which a protection interval is arranged, a synchronisation sequence, also known as AMSS, is inserted, as is indicated by block 60. A complete synchronisation sequence is then modulated onto a high frequency carrier by means of a complex IQ-modulator, and is then transmitted, e.g. from an aerial. This is represented symbolically by block 62. It should be pointed out that the processing of a synchronisation sequence up to transmitting through an aerial is well known, and therefore does not need to be described in more detail.

As has already been mentioned, an IFFT 56 is preferably used in the transmitter, or an FFT in the receiver, with 512 carriers. Thus the block IFFT 56 outputs 512 complex time instants in parallel, forming an MCM symbol, owing to the parallel mode of action of the fast Fourier transform. One MCM frame has, for example, a duration of 6 ms. As has been mentioned, this consists, for example, of 24 MCM symbols, between each of which a protection interval is inserted, the length of which is approx. 25% of the length of an MCM symbol in a preferred embodiment. Furthermore, the synchronisation sequence includes, for example, 396 bits. Thus, in a preferred embodiment of the invention, one frame can include 16,396 bits.

Thus, according to the invention, two transmission symbols, which differ from one another, are generated from one information symbol. If, for example, there is temporary channel interference, which affects all carriers in the same way, a gain can already be achieved if the second transmission symbol is retransmitted at a time $k_2$, which is at a distance in time from time $k_1$, at which the first transmission symbol was transmitted, the distance in time corresponding to the duration of the interference. In view of the interferences with respect to time which mainly occur, a differential time of approx. 5 MCM frames between the transmitter of the two transmission symbols is reasonable—for the example described this corresponds to approx. 30 ms. However, even with shorter time periods, a gain will also be achieved (which may possibly be smaller) if the channel interferences are shorter. If the interference in time of the transmitting channel affects all carriers to the same extent, it makes no difference whether the second transmission symbol is transmitted by means of exactly the same channel through which the first transmission symbol was transmitted. However, in practice interferences often occur which can lead to destruction, or, on the other hand, to intensification of individual carriers. It is therefore advisable not to transmit the second transmission symbol via the same carrier, but by way of a different carrier. There is then a possibility that, if the first transmission symbol has been modulated onto a carrier which was subjected to destructive interference, the second transmission symbol will be modulated onto a carrier which may even have been reinforced, compared to normally transmitted carriers, through constructive interference.

Furthermore, it is preferred that information is transmitted not just twice, but, depending on the channel, more than twice. If the channel is relatively poor, retransmission of an information symbol will be necessary more frequently than if the channel has low interference. The signal constellation diagram, which is shown in FIG. 1, or also in FIG. 2, permits the same information to be transmitted four times. Analogous to the case of double transmission, four transmission symbols will then be generated, which are all based on the same information symbol, but which themselves are different from each other. In this case the following carrier raster can be used. If the first transmission symbol has been transmitted via the first carrier, the second transmission symbol could be transmitted via the $32^{nd}$ carrier, the third transmission symbol via the $128^{th}$ carrier and the fourth transmission symbol via the $256^{th}$ carrier. Other frequency rasters are, however, also conceivable. Preferably transmission symbols are transmitted which are all based on the same information symbols, so that they are uniformly distributed over the frequency raster, since then there is the greatest possibility of finding at least one channel which has not been damped to an exceptionally great extent through destructive interference.

With regard to the amplitude weightings in the signal constellation of FIG. 1, weighting factors $c(i)$ of $\{0.18, 0.35, 0.53, 0.71\}$ are used. This permits almost maximum utilisation of the available amplitude range of 0 to 1.

In the following section reference is made to FIG. 6, which includes implementation of a soft-metric calculation for a receiver for digital signals. The following metric considerations are all related to a DPSK. However, in view of the previous remarks, analogous metric considerations for other modulation methods can be derived from this.

The transmission symbols can be represented as $s(k)=e^{j\Phi[k]}$, where $\phi[k]$ is the absolute phase. On the transmission side the actual transmission symbol can be expressed as follows:

$$s(k)=s(k-1)\cdot e^{j\phi[k]}=e^{+j(\phi[k-1]+\phi[k])} \qquad \text{(equ. 1)}$$

The useful information is represented in equation 1 in the differential phase term φ[k]. The receiving symbols can be expressed as follows:

$$r(k) = H\left(e^{j\frac{2\pi}{D}\mu}\right)s(k) + n(k) \quad \text{(equ. 2)}$$

In equation 2, H( . . . ) indicates the channel transmission function for the μth carrier. D represents the number of carriers and n(k) is the additive random noise. K is the current time, while k-1 represents the previous time.

The conditional probability density function for reception of r(k), if s(k) were transmitted, is as follows:

$$f(r(k)/s(k), \varphi(k)) \approx const \cdot e^{\frac{1}{\sigma_n^2}\operatorname{Re}\{r^*(k-1)r(k)e^{j\varphi(k)}\}} \quad \text{(equ. 3)}$$

Here, $\sigma_n^2$ is the variance of n(k) and is calculated as follows:

$$\sigma_n^2 = E\{|n(k)|^2\} \quad \text{(equ. 4)}$$

For calculation of a reliable metric, i.e. in order to determine, or to be able to decide on, reliable information in the receiver, the Log-Likelihood Ratio λ(k) of the individual binary symbols b(1) and b(0) are used, which are defined for the ith bit as follows:

$$\lambda^{(i)}(k) = \ln\left\{\frac{likelihood, thatBit(b^{(i)} = 1)}{likelihood, thatBit(b^{(i)} = 0)}\right\} \quad \text{(equ. 5)}$$

When written out, this then gives equation 6:

$$\lambda^{(i)}(k) = \ln\left\{\frac{\sum_{[\varphi] \in \{[\varphi]/i-tesBit=1\}} f(r(k)/s(k), \varphi) \cdot Pr\{\varphi\}}{\sum_{[\varphi] \in \{[\varphi]/i-tesBit=1\}} f(r(k)/s(k), \varphi) \cdot Pr\{\varphi\}}\right\} \quad \text{(equ. 6)}$$

Pr(φ) represents the probability that the phase of the information symbol to be determined takes on a certain value. Four different phase states exist (FIG. 1, FIG. 2), which all have the same probability. The probability Pr(φ) is therefore the same for all the summands of equation 6, and can be reduced out from equation 6. Thus the following expression results for the Log-Likelihood Ratios:

$$\lambda^{(i)}(k) = \ln\left\{\frac{\sum_{[\varphi] \in \{[\varphi]/i-tesBit=1\}} f(r(k)/s(k), \varphi)}{\sum_{[\varphi] \in \{[\varphi]/i-tesBit=0\}} f(r(k)/s(k), \varphi)}\right\} \quad \text{(equ. 7)}$$

If equation 3 is inserted into equation 7, and the summation written out, this results in the following expressions for the Log-Likelihood Ratios for the bits of the information symbol b(0) and b(1):

$$\lambda^{(0)} = \ln\left\{\frac{\exp\left\{\frac{1}{\sigma_n^2}\operatorname{Re}\{r^*[k-1] \cdot r[k] \cdot (-1)\}\right\} + \exp\left\{\frac{1}{\sigma_n^2}\operatorname{Re}\{r^*[k-1] \cdot r[k] \cdot (j)\}\right\}}{\exp\left\{\frac{1}{\sigma_n^2}\operatorname{Re}\{r^*[k-1] \cdot r[k] \cdot (1)\}\right\} + \exp\left\{\frac{1}{\sigma_n^2}\operatorname{Re}\{r^*[k-1] \cdot r[k] \cdot (-j)\}\right\}}\right\} \quad \text{(equ. 8)}$$

$$\lambda^{(1)} = \ln\left\{\frac{\exp\left\{\frac{1}{\sigma_n^2}\operatorname{Re}\{r^*[k-1] \cdot r[k] \cdot (-1)\}\right\} + \exp\left\{\frac{1}{\sigma_n^2}\operatorname{Re}\{r^*[k-1] \cdot r[k] \cdot (-j)\}\right\}}{\exp\left\{\frac{1}{\sigma_n^2}\operatorname{Re}\{r^*[k-1] \cdot r[k] \cdot (1)\}\right\} + \exp\left\{\frac{1}{\sigma_n^2}\operatorname{Re}\{r^*[k-1] \cdot r[k] \cdot (j)\}\right\}}\right\} \quad \text{(equ. 9)}$$

Using well known conversions, equation 8 and equation 9 can be simplified as follows:

$$\lambda^{(0)} = -\frac{1}{\sigma_n^2}(\operatorname{Re}\{r^*[k-1] \cdot r[k]\} + \operatorname{Im}\{r^*[k-1] \cdot r[k]\}) \quad \text{(equ. 10)}$$

$$\lambda^{(1)} = -\frac{1}{\sigma_n^2}(\operatorname{Re}\{r^*[k-1] \cdot r[k]\} - \operatorname{Im}\{r^*[k-1] \cdot r[k]\}). \quad \text{(equ. 11)}$$

Figure 6:
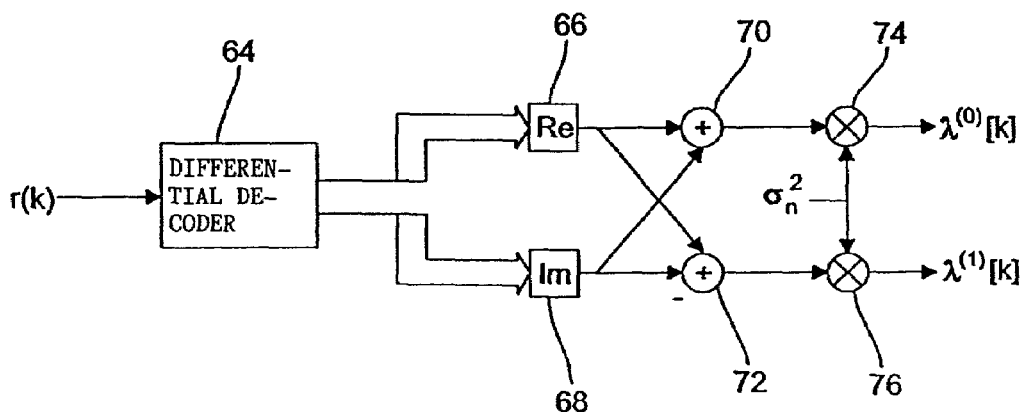
FIG. 6 is a block diagram for calculating the reliability metric for the DQPSK modulation in FIG. 4.

Equation 10 and equation 11 are realised by the block diagram in FIG. 6. In FIG. 6 an existing differential coding is first decoded by means of a differential decoder 64. The output signal of the differential decoder is then fed into two blocks, 66 and 68, wherein block 66 implements the function of extracting the real part of a complex number, whereas block 68 has the function of extracting the imaginary part of a complex number. Corresponding to equations 10 and 11, two summers, 70, 72, are shown in FIG. 6, these being served crosswise from blocks 66, 68. On the output side, two multipliers, 74, 76, are intended for carrying out multiplication of the variance of the additive noise n(k), at the output of which the required Log-Likelihood Ratios for the first bit b(0) and the second bit b(1) of the information symbol received to be determined are issued.

Thus FIG. 6 represents a fixed wired realisation of equation 10 and 11, in order that, in the known case of a signal constellation under consideration, such as that shown in FIG. 3, a soft metric calculation can be carried out with a signle transmission of an information.

Reference to the derivation of the soft metric calculation for the known case, represented in equations 1 to 11, will be made later, in order to derive a soft metric calculation for the case according to the invention, in which two transmission symbols are transmitted from the transmitter and received by the receiver, both being based on the same information symbol.

Figure 7:
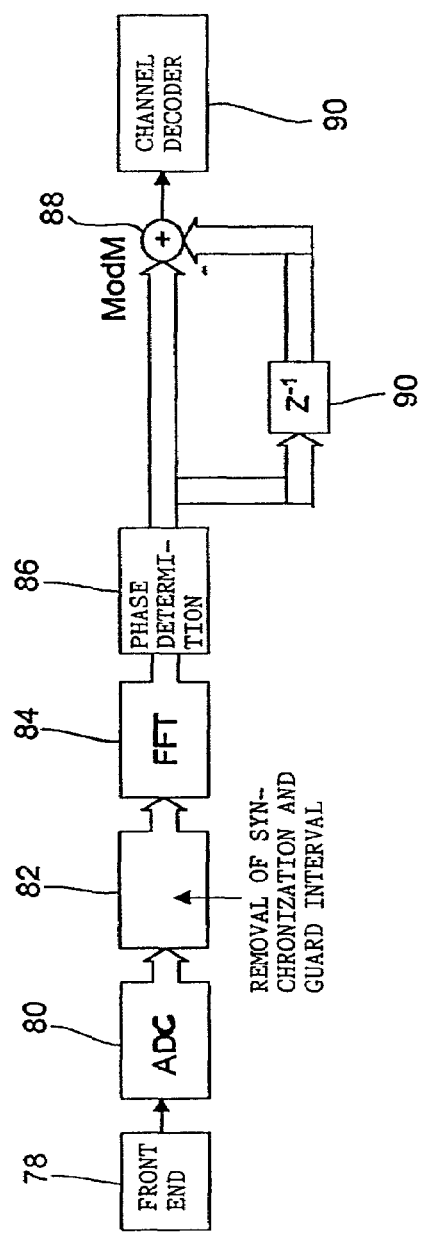
FIG. 7 is a block diagram of a receiver in accordance with the invention, which implements coherent decoding.

First of all, however, reference is made to FIG. 7, representing a receiver according to the invention, which works according to the coherence principle. Block 78, designated as the "front-end", includes a receiving aerial and certain well known signal processes, such as conversion to an intermediate frequency, filtering and the like. Block 80 is connected after block 78, and this block is designated ADC—for "Analogue Digital Converter". This block is intended to represent a "down sampling" and filtering operation, as well as an analogue to digital conversion. The RF signal received at the front-end 78 is thus converted to the base band, and is sampled from the ADC 80. Normally the output signal of the ADC is a complex signal, with a real part and an imaginary part, where both the real part and the imaginary part can be quantized with 8 bits or another word width determined by the ADC. With regard to the notation in the drawings, it should be pointed out that a wide arrow indicates that complex signals are being transmitted, with real and imaginary parts, while a thin arrow, which is shown by a single line, shows that only either a real or an imaginary part, or just one value, are being transmitted at one time.

Both the synchronisation sequence and the protection intervals between the MCM symbols are removed from the quantized sampling value sequence, which is output from the ADC 80, by block 82, this being designated as synchronisation and protection interval removal. Thus there is an MCM frame at the output of block 82, consisting only of the MCM symbols. Subsequently the MCM symbols are transformed, one after the other, into the frequency domain by block 84, which is designated as FFT and carries out a Fourier transform into the frequency domain. Thus the spectrum of an MCM symbol is situated at the output of the block FFT after an FFT operation, where the individual spectral values or spectral lines have a real part and an imaginary part. Both the real part and the imaginary part are quantized corresponding to the bit width of the ADC. As has already been mentioned, in a preferred embodiment both the real part and the imaginary part have a word width of 8 bits.

In the coherent case referred to in FIG. 7, the phase of each carrier with real and imaginary parts, i.e. each spectral line, is now estimated or determined in block 86, in a way which is well known to those skilled in the art. Therefore at the output of the phase determination block 86, there are successive phase values with respect to time, which reproduce the phases of the spectral lines received. By means of a ModM adder 88 and a delaying device 90, which gives a delay of one clock cycle, the differential coding introduced in the transmitter is cancelled, i.e. a differential decoding process (64, FIG. 6) is carried out. Thus at the output of the adder 88 there are phase values which should represent the information symbol formed in the transmitter at the output of block 52 (FIG. 5). The phase values at the output of the adder 88 are quantized as given by the phase determination device 86. Obviously the phase values at the output of the adder 88 will not be exactly 0°, 90°, 180° or 270°, but will deviate from the expected values, since phase distortions or other interferences will have been introduced both through the transmitter and through the receiver, and particularly through the (outdoor) transmission channel.

If no channel coding has been carried out in the transmitter shown in FIG. 5, i.e. the channel coder 50 was not present, the output signals of the adder 88 can be fed into a decision element, which, for example, determines that all phase values below 45° should correspond to a phase of 0°, while all phase values above a phase of 45° should correspond to a phase of 90° for one information symbol. A simple decision of this kind is called a "hard" decision. Such hard decisions can, however, lead to many false decisions. For this reason convolution coding has already been carried out in the channel coder 50, and this must now be cancelled again in the receiver by means of the block channel decoder 90. In this connection a Viterbi algorithm is used, in a way which is well known to specialists, if a convolution code has been fed into the transmitter. Other algorithms and methods for error-tolerant coding in the transmitter, and for corresponding error-tolerant decoding in the receiver, are known, and need not therefore be described further.

However, owing to destructive interference or similar disturbances of the transmission channel, it may occur that information is lost, in spite of the most efficient channel coding and channel decoding. In order to counteract this, information is transmitted twice or several times, according to the invention. In the simplest case two or n quantized phase values will then be at the output of the adder 88, at different times $k_1$ and $k_2$ or $k_n$. If one quantized phase value of the two quantized phase values relating to one single information symbol has a relatively unambiguous result in the receiver, while the other has a result which tends to be ambiguous, the other phase value can be neglected and the phase decision can be carried out for the one with a relatively unambiguous result. Needless to say that either "hard" decision or channel decoding is used. For mobile radio telephones convolution coding in the transmitter and corresponding channel decoding in the receiver is advantageous. Hard decisions can lead to a deterioration in the receiver reliability, particularly with mobile reception.

Alternatively both phase values can be added and then divided by two, so that a more reliable decision can be made by means of averaging. A further possibility is to determine the amplitude of the two transmission symbols received taking part in phase subtraction at the input of the phase determination device 86, and, then, having determined this, to take into consideration the quantized phase value for which the received transmission symbol had the largest amplitude before subtraction, in making a decision. A further possibility for combining the two transmission symbols received, based on the same information symbol, is to carry out a weighting according to the participating amplitudes and corresponding averaging. However, in accordance with a preferred embodiment of the present invention, both quantized phase differences representing the information symbol are used as "soft quantized" phase values, and are used in the channel decoding 90 by means of a Viterbi algorithm or a similar algorithm, in order to achieve a decision with a small number of erroneous decisions through a "soft" decision.

Figure 8:
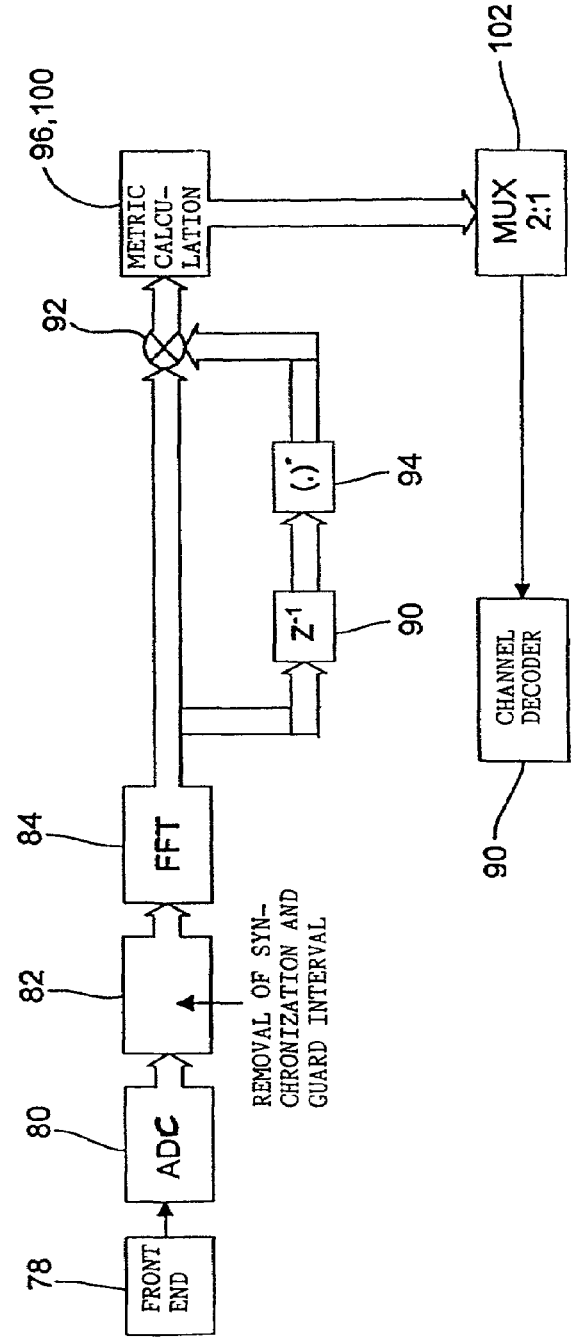
FIG. 8 is a block diagram of a receiver in accordance with the invention, which implements incoherent decoding.

FIG. 8 shows a block diagram of a receiver according to the invention, for incoherent reception. The diagram of the receiver in FIG. 8 corresponds to the receiver in FIG. 7 up to the block FFT. However, the incoherent principle in the receiver in FIG. 8 manifests itself in that no phase determination device 86 (FIG. 7) is present, but instead of this there is a multiplier 92, a delaying device 90 and a device 94 for forming a conjugated complex value. In the receiver shown in FIG. 8 the elements 90, 92 and 94 serve to re-cancel the differential coding which has been introduced in the transmitter (FIG. 5), so as to be able to again derive the originally transmitted symbol b(1) b(0) from the transmitted symbols received. The complex product of the current transmission symbol and the conjugated complex transmission symbol of the last cycle is then at the output of the multiplier 92.

If complex notation according to magnitude and phase is used, a value which has the result of the multiplication of the magnitudes of the current transmission symbol and the previous transmission symbol as its magnitude is at the output of the multiplier 92. This value has the difference in the phases of the current and previous transmission symbols as its phase. The useful information required is contained in this phase difference, since the transmitter has carried out a differential phase shift-keying with the transmission symbols. Contrary to the coherent receiver shown in FIG. 7, for which only a ModM addition (88) was necessary to form a phase difference, in the incoherent receiver shown in FIG. 8 multiplication of two complex numbers takes place.

Since with mobile reception the amplitudes of the receiving signals are usually relatively small, the amplitudes of the differential symbols received at the output of the multiplier 92 will be even smaller. However, this means that the probability of making the correct decision is significantly reduced, when determining which of the, for example, four phase states is present. In this connection, attention is drawn briefly to FIG. 3. If the transmission symbol b(1) b(0)=00 is considered, which in the case of a transmission has an amplitude of 1 or a weighted amplitude (FIG. 1), it can be seen that the phase decision becomes more and more unreliable, the smaller the amplitude of the received transmission symbol becomes. In the extreme case, if the amplitude is so small that it is almost at the origin of the complex plane, a phase decision is no longer possible, although the differential symbol received at the output of the multiplier 92 certainly contains a phase term in the calculation. However, owing to the very small amplitude at this point, this phase term is no longer significant, and, if no further precautions are taken, will almost inevitably lead to a false decision. Therefore, according to the invention, in the same way as for the metric calculation, which is represented in equations 1 to 11, a metric calculation unit 96 is also connected after the multiplier 92 for the reception of two transmission symbols, both of which relate to a single information symbol.

The following section refers to the metric calculation unit 96, according to the invention. However, before a derivation of the Log-Likelihood Ratios for the concept according to the invention is described, in which two transmission symbols differing from one another but related to the same information symbol are transmitted, reference will first be made to FIG. 9, in order to give a general illustration with respect to time. At a time $k_1$, at which the first transmission symbol is received, or at which the corresponding differential symbol is calculated for the first transmission symbol in which the useful information is contained, the first metric calculation 96a is carried out. At time $k_2$, at which the second transmission symbol is received, or at which the corresponding differential symbol is received with differential coding, a metric calculation 96b is also carried out for the second received transmission symbol. The result of the first metric calculation 96a is stored intermediately in a storage unit 98, in order to keep this value within the time interval between $k_1$ and $k_2$. When the second metric calculation 96b has been completed, the result of the first metric calculation is read out from the storage unit 98, and in a metric combination device is combined with the result of the second metric calculation. As already mentioned, the metric combination can be a simple addition. Alternatively a decision can also be carried out in the metric combination device 100, the metric of which is more reliable. The more favourable metric is then taken for further processing in channel decoder 96, while the other is rejected. Furthermore, a weighted addition can also be carried out in the metric combination device 100. In this case amplitudes of the transmission symbols received, which are based on a corresponding differential symbol, are taken into consideration, in order to be able to decide which metric is likely to be more reliable. If the transmission symbols received tend to have a large amplitude, it can be assumed that they carry correct information, whereas this is not certain with transmission symbols received tending to have small amplitudes. The result of the metric combination device 100 is then fed into a channel decoder 90, corresponding to the channel decoder 90 in FIG. 7, which implements a Viterbi algorithm and similar algorithms, and uses a convolution code in the channel coder 50 (FIG. 5).

Figure 9:
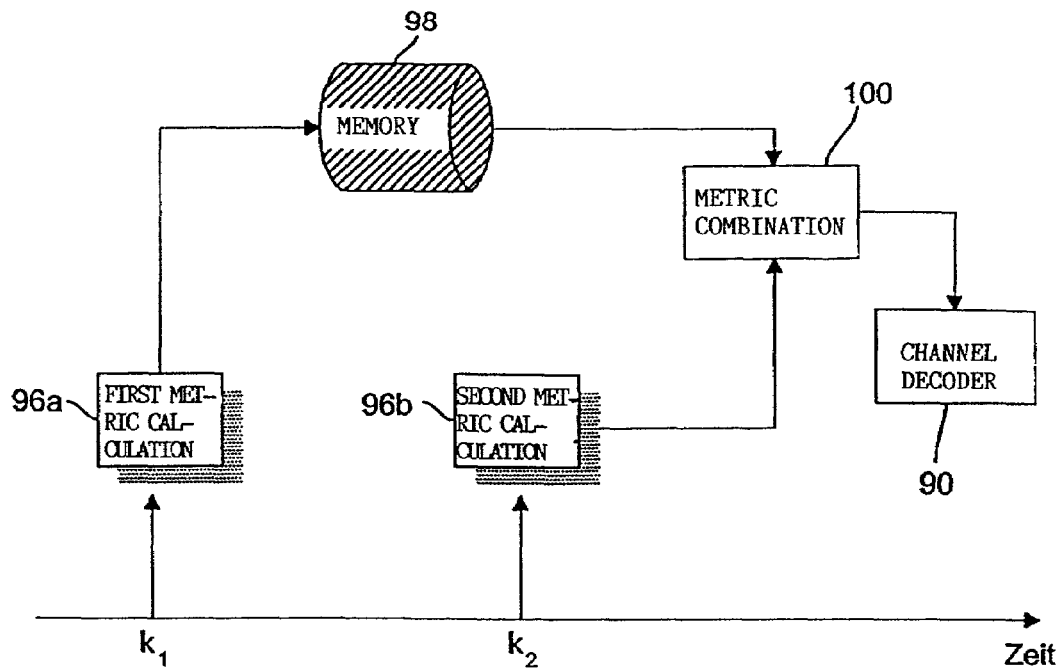
FIG. 9 is a basic circuit diagram representing the metric calculation according to the invention.

From FIG. 9 it can be seen that the concept according to the invention, which, as an example, is shown in combination with two transmission symbols differing from one another but being related to the same information symbol, can be extended without any problem to the case where more than two transmission symbols are generated. This leads not only to double, but multiple transmission of one single information symbol. If, for example, a quadruple information transmission is assumed (as is used in the preferred embodiment), since the second mapper 54 creates a quadruple extension of the constellation diagram, further metric calculation devices 96 and further storage units 98 are used. In this case the metric combination device 100 will have four inputs, in order to be able to combine the results of the individual metric calculations at the times $k_i$. The more frequently an information symbol is retransmitted, the greater will be the number of correct decisions in the channel decoder 90. Obviously, however, the more frequently information is retransmitted, the more strongly the bit efficiency will drop, and this will be greatest in the case of a simple transmitter. However, owing to the effective compression algorithms, which are, for example, implemented in the MPEG standard family, and owing to the presence of rapid circuits, permitting a high carrier frequency in the lower to medium gigahertz range, the transmitted quantity of bits is not as decisive as is reliable detection. Particularly when one considers that the system according to the invention is to be used for digital broadcasting, it will be realised that reliable acquisition, with a minimum number of false decisions, is most important for this type of product to be accepted on the market. This applies particularly to transmission channels with difficult topology, as, for example, in a large city with many skyscrapers. Most customers are to be found especially in large cities, and in the centres of large cities, so that this represents the biggest challenge for digital broadcasting. Therefore it will be here in particular, where error-free reception without interference, has top priority.

The following section describes the metric calculation, which is carried out in the first metric calculation device 96a and in the second metric calculation device 96b. Attention is drawn to the fact that in practice the first metric calculation device 96a and the second metric calculation device 96b will be the same metric calculation device, since, as can be seen in FIG. 9, metric calculations are carried out here at different times.

In the following section the realisation of a circuit for calculation of the Log-Likelihood Ratios in the case according to the invention, which involves the transmission of two transmission symbols differing from one another but based on the same information symbol, is derived by means of equations.

For this two pairs, $r(k_1-1)$, $r(k_1)$ or $r(k_2-1)$, $r(k_2)$, of receiving symbols are considered, the times $k_1$ and $k_2$ being different from one another. In order to simplify the derivation, the transition between the associated transmission symbols $s(k_1-1)$ to $s(k_1)$ is represented by a common (source) bit (index 1). This means that it is assumed that bit i in the transition from $s(k_1-1)$ to $s(k_1)$ or bit j in the transition from $s(k_2-1)$ to $s(k_2)$ are identical. At this point attention is drawn to the fact that the transmission symbols are represented by s(k), while the receiving symbols are represented by r(k). (s=send, r=receive). If the two receiver pairs are considered independently of one another, the probability, or the Log-Likelihood Ratio, for the sought-after binary symbol (as in the case of FIG. 6) can be found. To this end, $\phi_1$ is allocated to the receiver pair r($k_1$−1), r($k_1$) and $\phi_2$ to the receiver pair r($k_2$−1), r($k_2$). The Log-Likelihood Ratios $\lambda^{(l)}$ for bit i or bit j are given as follows, both for $\phi_1$ and $\phi_2$, wherein 1 can be 0 or 1 if the information symbol b(1) b(0) consists of 2 bits.

$$\lambda^{(l)}(k) = \ln\left\{\frac{likelihood, thatBit(b^{(l)} = 1)}{likelihood, thatBit(b^{(l)} = 0)}\right\} \quad \text{(equ. 12)}$$

$$\lambda^{(l)}(k) = \quad \text{(equ. 13)}$$

$$\ln\left\{\frac{\sum\limits_{[\varphi]\in\{[\varphi_1\varphi_2]/i-tesBit=1\}} f(r(k_1), r(k_2)/s(k_1), s(k_2), \varphi_1, \varphi_2)\cdot\Pr\{\varphi_1\varphi_2\}}{\sum\limits_{[\varphi]\in\{[\varphi_1\varphi_2]/i-tesBit=0\}} f(r(k_1)r(k_2)/s(k_1), s(k_2), \varphi_1, \varphi_2)\cdot \Pr\{\varphi_1\varphi_2\}}\right\}$$

If the received pairs considered are relatively remote from one another with respect to time, then independent transmission conditions can be assumed. This makes it possible for both events to be considered as statistically independent of one another. The equation representing this is as follows:

$$Pr\{\phi_1, \phi_2\} = Pr\{\phi_1\}\cdot Pr\{\phi_2\} \quad \text{(equ. 14)}$$

This results in the following:

$$\sum_{[\varphi]\in\{[\varphi_1,\varphi_2]/i-testBit=1\}} f(r(k_k), r(k_2)/s(k_1), s(k_2), \varphi_1, \varphi_2) = \quad \text{(equ. 15)}$$

$$\sum_{[\varphi]\in\{[\varphi_1]/i-testBit=1\}} f(r(k_k)/s(k_1), \varphi_1) \cdot$$

$$\sum_{[\varphi]\in\{[\varphi_2]/j-testBit=1\}} f(r(k_2)/s(k_2), \varphi_2).$$

For the 1-th bit this therefore results in the following equations:

$$\lambda^{(l)} = \ln\left\{\frac{\sum\limits_{[\varphi]\in\{[\varphi_1]/i-testBit=1\}} f(r(k_1)/s(k_1), \varphi_1)\cdot\Pr\{\varphi_1\}\cdot \sum\limits_{[\varphi]\in\{[\varphi_2]/j-testBit=1\}} f(r(k_2)/s(k_2), \varphi_2)\cdot\Pr\{\varphi_2\}}{\sum\limits_{[\varphi]\in\{[\varphi_1]/i-testBit=0\}} f(r(k_1)/s(k_1), \varphi_1)\cdot\Pr\{\varphi_1\}\cdot \sum\limits_{[\varphi]\in\{[\varphi_2]/j-testBit=0\}} f(r(k_2)/s(k_2), \varphi_2)\cdot\Pr\{\varphi_2\}}\right\} \quad \text{(Equ. 16)}$$

$$\lambda^{(l)} = \ln\left\{\frac{\sum\limits_{[\varphi]\in\{[\varphi_1]/i-testBit=1\}} f(r(k_1)/s(k_1), \varphi_1)\cdot\Pr\{\varphi_1\}}{\sum\limits_{[\varphi]\in\{[\varphi_1]/i-testBit=0\}} f(r(k_1)/s(k_1), \varphi_1)\cdot\Pr\{\varphi_1\}}\right\} + \ln\left\{\frac{\sum\limits_{[\varphi]\in\{[\varphi_1]/i-testBit=1\}} f(r(k_2)/s(k_2), \varphi_2)\cdot\Pr\{\varphi_2\}}{\sum\limits_{[\varphi]\in\{[\varphi_1]/i-testBit=0\}} f(r(k_2)/s(k_2), \varphi_2)\cdot\Pr\{\varphi_2\}}\right\} \quad \text{(equ. 17)}$$

From equation 16 and equation 17 it can be seen that, with statistical independence, a simple addition of the Log-Likelihood Ratios can be carried out for the corresponding bit of the information symbol:

$$\lambda^{(l)} = \lambda^{(i)} + \lambda^{(j)} \quad \text{(Gl. 18)}$$

Figure 10:
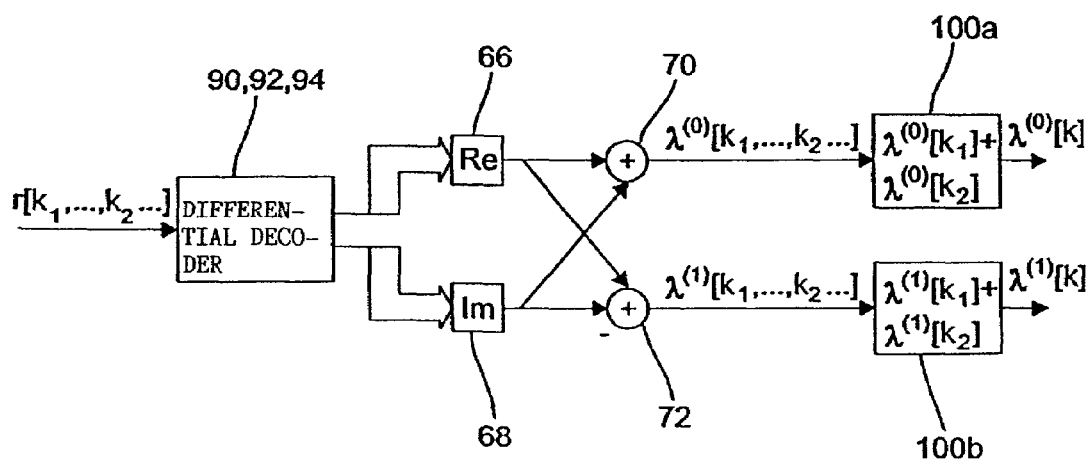
FIG. 10 is a block diagram for implementation of the soft metric calculation.

FIG. 10 shows this result represented pictorially. A sequence of receiving symbols r[$k_1$, ... $k_2$, ... ] is fed into a differential decoder, which includes the elements 90, 92, 94 of FIG. 8. The result of the multiplier 92 is then re-fed into a real part device 66 and an imaginary part device 68, which in turn serve two summers 70, 72 crosswise. If the information symbol, which is to be determined, has been transmitted twice from the transmitter, two metric combination devices, 100a, 100b, are required to realise the addition of equation 16. The Log-Likelihood Ratios for the information symbol are then at the output, these having been determined by means of two transmissions of the same information symbol. As can be seen in FIG. 8, these two values are fed into a multiplexer 102, in such a way that one Log-Likelihood Ratio after the other is fed into the channel decider 90, in order that a soft decision can be made here, for example, by means of the Viterbi algorithm. This is reproduced through the simple connection line between the multiplexer 102 and the channel decoder 90.

In the following section the signal constellation (which is shown in FIG. 1) is described as an example for representing the determination of the Log-Likelihood Ratios in this case of the "4-DAPSK". The phase can adopt one of the four states {0, $\phi$/2, $\phi$, 3$\phi$/2}. For the amplitude weightings 4 c(i) exist, i from {0, 1, 2, 3}, where for a practical application the following c(i) can be taken: {c(0), c(1), c(2), c(3)={0.18, 0.35, 0.53, 0.71}. Using the definition given in equation 11, this results in equation 19, which is analogous to equation 13.

$$\lambda^{(i)}(k) = \ln\frac{\sum\limits_{i-testBit=1} f(r(k_1), r(k_2)/s(k_1), s(k_2), c^{(j)}, \varphi)\cdot\Pr\{c^{(j)}, \varphi\}}{\sum\limits_{i-testBit=0} f(r(k_1), r(k_2)/s(k_1), s(k_2), c^{(j)}, \varphi)\cdot\Pr\{c^{(j)}, \varphi\}} \quad \text{(equ. 19)}$$

Owing to the fact that the phase and the amplitude are variables which are independent of one another, equation 14 can be written analogously, as follows:

$$Pr\}c^{(j)},\phi\} = Pr\{c^{(j)}\}\cdot Pr\{\phi\} \quad \text{(equ. 20)}$$

The result for the Log-Likelihood Ratios is written out as follows:

$$\lambda^{(i)}(k) = \ln \frac{\sum_{i-testBit=1} f(r(k_1), r(k_2)/s(k_1), s(k_2), c^{(j)}, \varphi) \cdot \Pr\{c^{(j)}\} \cdot \Pr\{\varphi\}}{\sum_{i-testBit=0} f(r(k_1), r(k_2)/s(k_1), s(k_2), c^{(j)}, \varphi) \cdot \Pr\{c^{(j)}\} \cdot \Pr\{\varphi\}} \quad \text{(equ. 21)}$$

From equation 21 it can be seen that the probability $\Pr\{c^{(i)}\}$ for reception of a certain weighted amplitude represents a multiplicative weighting for the Log-Likelihood Ratios. Therefore the probability density function in the case of the DQPSK represented is calculated from the probability density function for the DQPSK with a certain amplitude c which is then multiplied by $\Pr\{c^{(j)}\}$ in the denominator and in the numerator of equation 21. This means that the individual amplitudes appear in the Log-Likelihood Ratios through a weighting corresponding to their probabilities. Analogous equations can be derived on the basis of the above derivation for the signal constellation diagram in FIG. 2.

Summarising, it has been established that the present invention, in combination with a modulation/demodulation process, is useful for carriers of a multi-carrier modulation transmission, and in the special case of an OFDM. On the one hand an enlargement of the signal constellation is achieved, and on the other, a "mapping diversity" gain is achieved through multiple representation of the information on the carriers. Thus, for the "mapping diversity" each information bit is transmitted at least twice. Preferably the time interval between transmission of the same information should be long. In this case the two events can be considered as statistically independent of one another. If, however, the transmission channel itself is considered, a shorter time interval, for which the two transmission processes cannot be considered as being statistically completely independent of one another, will also lead to an increase in detection reliability, if the channel is subjected to only short time variations.

"Demapping", or demodulation in the case of "mapping diversity", can be used both in the coherent (FIG. 7) and the incoherent case (FIG. 8). Metric calculation in the case of "mapping diversity" is carried out in two steps. The first metric is calculated at time $k_1$ and stored. The second metric is then calculated at time $k_2$ and subsequently combined with the first metric, wherein this combination is carried out preferably as an addition. The result of the metric combination is then passed on to the channel decoder in the receiver.

For a better understanding, in the following section the Log-Likelihood Ratios are briefly explained, or how these are evaluated in the channel decoder 90. From equation 11, for example, it can be seen that the value range corresponding to the logarithmic function extends between—infinity and+infinity. If a Log-Likelihood Ratio has a very negative value, this means that the probability that a bit has a 1 is very low, and that the probability that a bit has a 0 is very high. Thus in this case, a very reliable decision can be made that the bit under consideration is just 0. If the Log-Likelihood Ratio has a very large value, i.e. if the argument of the logarithm is very large, it can be seen that the probability that a bit is 1 is more likely to be high, while the probability that a bit is 0 is very low. A very reliable decision can then be made that the bit has a 1. Therefore, for further decoding in the channel decoder 90, the bits b(0), b(1), are replaced by the corresponding Log-Likelihood Ratios. Evaluation of the Log-Likelihood Ratios could, for example, be carried out by establishing that everything which is under 0.5 is a 0, and everything that is over 0.5 is a 1. Even when the Log-Likelihood Ratios are greater than 1, it can be said that there will be a reliable 1, while a value below 1 represents a less reliable 1.

Figure 11:
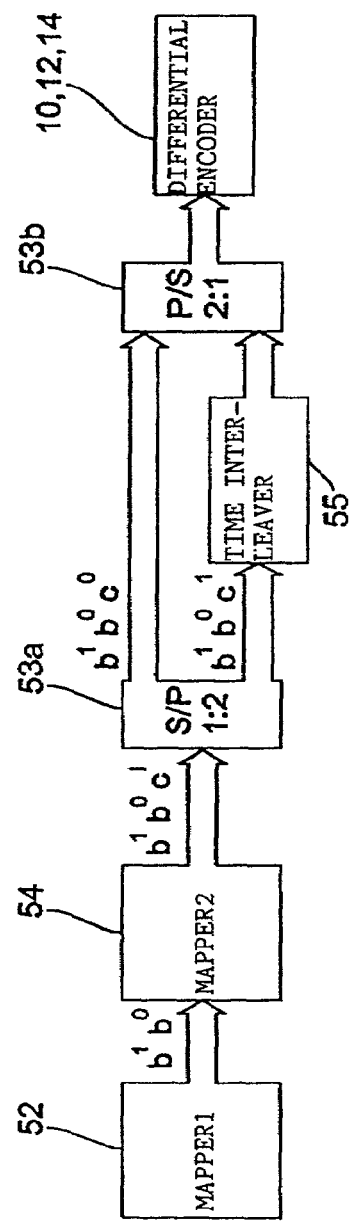
FIG. 11 is a detailed block diagram of part of the transmitter in FIG. 5.

For a detailed explanation of the transmitter, in accordance with an embodiment of the present invention (shown in FIG. 5), FIG. 11 should now be observed. FIG. 11 shows, as in FIG. 5, the first mapper 52, the second mapper 54, connected after this, and a series-parallel converter 53a. In considering the case of transmitting two transmission symbols related to the same information symbol, both mappers generate first of all the first transmission symbol $b^1b^0c^0$ and then the second transmission symbol $b^1b^0c^1$. These two transmission symbols are generated serially and then parallelised through 53a. The first transmission symbol runs then directly into a parallel-series converter 53b, while the second transmission symbol is fed into a time interleaver, in order to achieve transmission of the second transmission symbol at a later time. After a preferably fixed adjusted time, the time interleaver inserts the transmission symbol, which has been fed into it, into the transmission bit stream before the differential decoder 10, 12, 14. The time interleaver can be arranged, in order to allocate the second transmission symbol to the same carrier as for the first transmission symbol at a later time, or preferably to allocate to another carrier, as has already been described.

From FIG. 11 it is also clear that for a preferred embodiment of the transmitter according to the invention, the order of weighting is fixed. This means that the first transmission symbol always has the weighting c(0), the second transmission symbol always has the weighting c(1), the third transmission symbol always has the weighting c(2) etc. This has the advantage that the receiver knows right from the start which weighting a received symbol should have, since the order of weighting is preferably predetermined.

Figure 12:
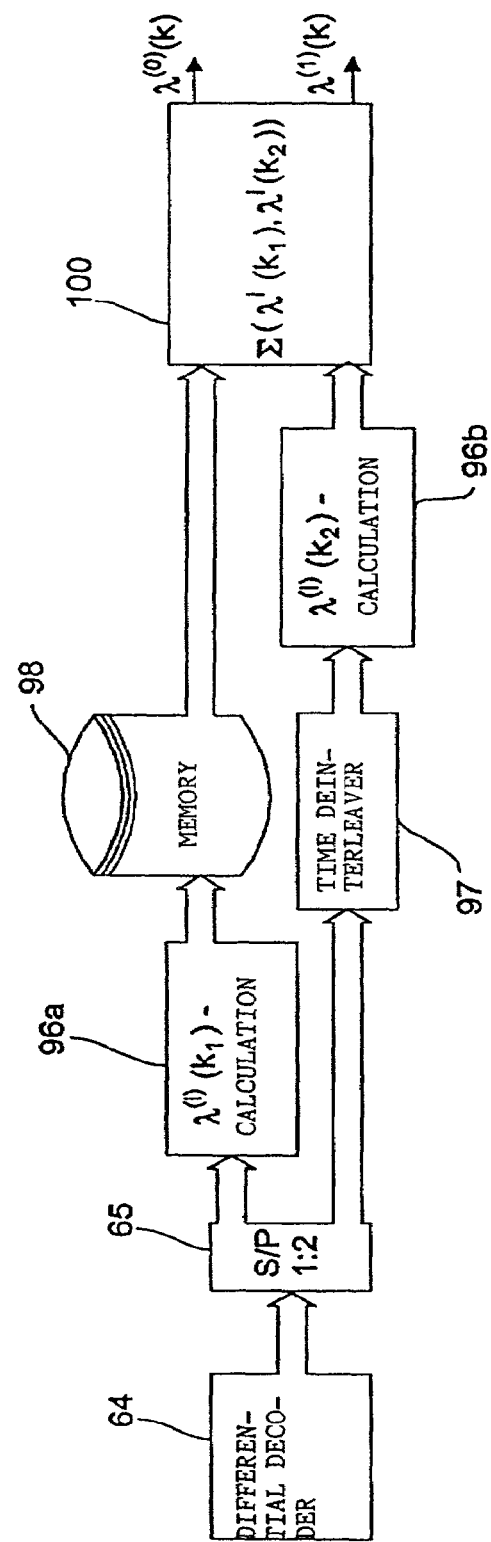
FIG. 12 is a detailed block diagram of part of the receiver in FIG. 7.

FIG. 12 shows a somewhat detailed representation of the receiver according to the invention, from FIG. 7 or FIG. 8. FIG. 12 is also similar to FIG. 9. The differential decoder is connected after a series-parallel converter 65. This feeds, on the one hand the first metric calculation device 96a, and on the other a time de-interleaver 97, which removes the optional symbol, channel-wise interleaving with respect to time, introduced through the time interleaver 55. The second metric calculation device 96b, is connected after the time interleaver 97. Metric combination is carried out preferably by the addition of the two single ratios in the metric combination device 100, as has already been described in detail.

The Viterbi decoder, which is preferably contained in the channel decoder, takes the two output signals of the device 100 as an input, and calculates the metric from an initial state to a final state in a trellis diagram. The route with maximum metric then gives the estimated information sequence in addition to the estimated code sequence. In the coherent case, in which no Log-Likelihood Ratios are used, the receiving signals are preferably added at time $k_1$ and $k_2$ before the input of the Viterbi decoder. This is also known as maximum ratio combining (MRC).

With regard to the channel properties, the following comments should be made. Needless to say that during transmission, the channel itself is unknown. However, it is necessary for the channel to be estimated in the receiver. This estimation will turn out to be different in every practical implementation, since channel estimation depends on the system, the set-up and the type of channel used. With regard to noise, additive white Gaussian noise (AWGN) is primarily considered. In this case, on the one hand, distribution of the noise, and on the other, the ratio of the signal level to noise level is known.

This information is used in the channel decoder for further decoding. If a convolution code is used in the transmitter, a Viterbi decoder is used in the receiver, as has already been frequently mentioned. For practical implementation $1/\sigma_n^2$ is identical for all metric increments and is therefore irrelevant for decoding in the Viterbi decoder. Therefore, as can already be seen in FIG. 10, $1/\sigma_n^2$ can be neglected without loss.

The invention claimed is:

1. Method for transmitting information symbols using a plurality of carriers, the method comprising the following steps:
   generating a first transmission symbol from an information symbol;
   generating a second transmission symbol from the same information symbol, the second transmission symbol being different to the first transmission symbol,
   wherein the steps of generating the first transmission symbol and the second transmission symbol are performed using a signal constellation diagram having a predefined number of different states in a complex constellation plane, the first transmission symbol having a first state in the complex constellation plane, and the second transmission symbol having a second state in the complex constellation plane,
   wherein the steps of generating the first transmission symbol and the second transmission symbol are performed such that the first state is one state of a plurality of predefined phase states and the second state has a different phase state than the first state, or the second state has the same phase state as the first phase state but has a different amplitude than the first state;
   modulating the first transmission symbol on a carrier, and transmitting the carrier modulated with the first transmission symbol at a first time; and
   modulating the second transmission symbol on a carrier, and transmitting the carrier modulated with the second transmission symbol at a second time, the second time being after the first time,
   wherein N different carriers, N information symbols, N first transmission symbols and N second transmission symbols are present, and
   wherein the step of modulating the first transmission symbol or the step of modulating the second transmission symbol include an inverse Fourier transform of the N carriers modulated with the first or second transmission symbols.

2. Method for transmitting information symbols using a plurality of carriers, comprising the following steps:
   generating a first transmission symbol from an information symbol;
   generating a second transmission symbol from the same information symbol, the second transmission symbol being different to the first transmission symbol,
   wherein the steps of generating the first transmission symbol and the second transmission symbol are performed using a signal constellation diagram having a predefined number of different states in a complex constellation plane, the first transmission symbol having a first state in the complex constellation plane, and the second transmission symbol having a second state in the complex constellation plane,
   wherein the steps of generating the first transmission symbol and the second transmission symbol are performed such that the first state is one state of a plurality of predefined phase states and the second state has a different phase state than the first state, or the second state has the same phase state as the first phase state but has a different amplitude than the first state; generating a difference between the first transmission symbol and a transmission symbol preceding the first transmission symbol in time, in order to obtain a first differential symbol;
   generating a difference between the second transmission symbol and a transmission symbol preceding the second transmission symbol in time, in order to obtain a second differential symbol;
   modulating the first differential symbol on a carrier, and transmitting the carrier modulated with the first differential symbol at the first time; and
   modulating the second differential symbol on a carrier, and transmitting the carrier modulated with the second differential symbol at a second time, the second time being after the first time.

3. Method in accordance with claim 2, in which the carrier modulated with the first transmission symbol or differential symbol differs from the carrier modulated with the second transmission symbol or differential symbol.

4. Method in accordance with claim 2, in which the period of time between the first time and the second time is so long that transmission with the carriers modulated with the two transmission symbols or differential symbols via a transmission channel are statistically independent of one another.

5. Method in accordance with claim 2, in which, in addition to the first and second transmission symbol, two further transmission symbols are transmitted at different times, the two transmission symbols having the same phase state from a number of four phase states in the complex plane, but having different amplitudes to each other taken from a number of four specified amplitudes.

6. Method in accordance with claim 5, in which phase allocation to a binary symbol is carried out before the step of modulating, and in which the step of modulating includes a step of inverse frequency transforming the plurality of phase shift-keyed carriers into the complex time domain.

7. Method in accordance with claim 1,
   in which N different carriers, N information symbols, N first mission symbols and N second transmission symbols are present,
   in which a multi-carrier modulator symbol includes the result of an inverse Fourier transform of the N carriers incorporating the transmission symbols or differential symbols, and in which an MCM frame exhibits a plurality of MCM symbols.

8. Method in accordance with claim 1 or 2, in which N second transmission symbols corresponding to N information symbols, are distributed in time over several MCM frames.

9. Method for receiving information symbols transmitted by means of a plurality of carriers, the information symbol being generated using an Inverse Fourier Transform for parallel modulation of a plurality of transmission symbols onto a plurality of carriers, in order to generate a multi carrier modulation symbol as the information symbol, wherein an information symbol is represented by a first transmission symbol and a second different transmission symbol, which are received at different times, wherein the first transmission symbol and the second transmission symbol are generated using a signal constellation diagram having a predefined number of different states in a complex constellation plane, the first transmission symbol having a first state in the complex constellation plane, and the second transmission symbol having a second state in the complex constellation plane, and wherein the first state is one state of a plurality of predefined phase states and the second state has a different phase state than the first state, or the second state has the same phase state as the first phase state but has a different amplitude than the first state, comprising the following steps:

processing the multi carrier modulation symbol using a forward Fourier Transform for obtaining a plurality of modulated carriers having a first or a further carrier;

demodulating the first carrier, in order to obtain the first received transmission symbol at a time storing the first received transmission symbol, or of information which refers to the first received transmission symbol;

demodulating the further carrier at a second time, in order to obtain a second received transmission symbol, and using the stored first received transmission symbol or the information which refers to the first received transmission symbol and the second received transmission symbol, in order to determine the information symbol, on which the two received transmission symbols are based, by ascertaining to which information symbol from the information symbols the first received transmission symbol and the second received transmission symbol being different from the first received transmission symbol are allocated, by using the signal constellation diagram.

10. Method in accordance with claim 9, in which both carriers are different to one another.

11. Method in accordance with claim 9, in which the transmission symbols are differentially coded, one information symbol being represented by the difference between two transmission symbols adjacent to each other in time, which furthermore includes the following steps:

estimating phases of the first received transmission symbol and of one of the received transmission symbols preceding in time the first received transmission symbol;

calculating the difference between the estimated phases, in order to obtain a first received phase difference referring to the information symbol;

conducting the steps of estimating and calculating the difference for the second received transmission symbol, in order to obtain a second received phase difference referring to the same information symbol;

carrying out a soft decision, based both on the first and second received phase differences, in order to obtain a first value and second values for the information symbol; and determining the information symbol using the first value and/or the second value.

12. Method in accordance with claim 11, in which, instead of the step of carrying out a soft decision, the following step is carried out:

carrying out a hard decision, based both on the first and second received phase difference, in order to obtain a first value and a second value for the information symbol.

13. Method in accordance with claim 11, in which, in the step of determining, greater consideration is given to the value for which the amplitudes of the transmission symbols, on which its reception is based and from which the phase difference has been determined, are closer to a predetermined threshold.

14. Method in accordance with claim 9, in which the transmission symbols are differentially coded, wherein one information symbol is represented by the difference between two transmission symbols adjacent in time, which furthermore includes the following steps:

multiplying a first received symbol by the conjugated complex value of a preceding received symbol;

multiplying a second received symbol by the conjugated complex value of a preceding received symbol;

calculating Log-Likelihood Ratios for each of the multiplication results; and determining the information symbol from first and second Log-Likelihood Ratios.

15. Method in accordance with claim 14, in which, in the step of determining, the Log-Likelihood Ratios for which the multiplication result on which they are based has a higher magnitude are given more consideration.

16. Method in accordance with claim 14, in which, in the step of determining, the Log-Likelihood Ratios of both multiplication results are added, in order to obtain a Log-Likelihood Ratio for each bit of the information symbol.

17. Method in accordance with claim 14, in which the Log-Likelihood Ratios for the bits of the information symbol are passed to a Viterbi decoding algorithm, in order to determine the bits of the information symbol in the receiver.

18. Apparatus for transmission of information symbols by means of a plurality of carriers, comprising:

a generator for generating a first and a second transmission symbol, based on s single information symbol, wherein the first and second transmission symbols differ from one another, wherein the generator is adapted to use a signal constellation diagram having a predefined number of different states in a complex constellation plane, the first transmission symbol having a first state in the complex constellation plane, and the second transmission symbol having a second state in the complex constellation plane, wherein the generator is adapted to operate such that the first state is one state of a plurality of predefined phase states and the second state has a different phase state than the first state, or the second state has the same phase state as the first phase state but has a different amplitude than the first state;

a modulator for modulating the first and second transmission symbols on a first and second carrier; and a transmitter for transmitting the modulated first transmission symbol at a first time, and the modulated second transmission symbol at a second time, wherein the second time is after the first time, wherein N different carriers, N information symbols, N first transmission symbols and N second transmission symbols are present, and wherein the modulator is adapted to perform an inverse Fourier transform of the N carriers modulated with the first or second transmission symbols.

19. Apparatus in accordance with claim 18 in which the first carrier and the second carrier differ from one another.

20. Apparatus in accordance with claim 18, in which the generator further comprises:

a grouper for grouping a plurality of bits, in order to form an information symbol; and a modifier for changing the first and/or second transmission symbol independently of information represented by the information symbol.

21. Apparatus in accordance with claim 18, in which the generator is adapted to generate more than two transmission symbols differing form each other, in which the modulator is adapted for modulating more than two transmission symbols of the respective carriers, and in which the transmitter is adapted for transmitting the more than two transmission symbols, each at different times.

22. Apparatus in accordance with claim 18, which furthermore comprises:
a differential coder for generating differential symbols between the transmission symbols and respective transmission symbols which precede the transmission symbols in time.

23. Apparatus in accordance with claim 18, which furthermore comprises:
an allocator for allocating the symbols to be modulated to one phase value from a predefined number of phase values.

24. Apparatus in accordance with claim 18, which furthermore comprises:
a channel coder for performing a convolution coding of information words, in order to generate bits for the information symbols.

25. Apparatus in accordance with claim 18, which furthermore comprises:
a protection interval inserter for inserting a protection interval between the two MCM symbols, and
a synchronisation interval inserter for inserting a synchronisation sequence, in order to form an MCM frame.

26. Apparatus in accordance with claim 25, which furthermore comprises:
an MCM modulator for modulating an MCM frame on an RF carrier, and
an aerial for transmitting the modulated RF carrier.

27. Apparatus for the reception of information symbols, which are transmitted by means of a plurality of carriers, the information symbol being generated using an Inverse Fourier Transform for parallel modulation of a plurality of transmission symbols onto a plurality of carriers, in order to generate a multi carrier modulation symbol as the information symbol, wherein an information symbol is represented by a first and a second transmission symbol, each being different from the other, which are received at different times, wherein the first transmission symbol and the second transmission symbol are generated using a signal constellation diagram having a predefined number of different states in a complex constellation plane, the first transmission symbol having a first state in the complex constellation plane, and the second transmission symbol having a second state in the complex constellation plane, and wherein the first state is one state of a plurality of predefined phase states and the second state has a different phase state than the first state, or the second state has the same phase state as the first phase state but has a different amplitude than the first state, comprising:
a forward Fourier transformer for processing the multi carrier modulation symbol using a forward Fourier Transform for obtaining a plurality of modulated carriers having a first or a further carrier;
a demodulator for demodulating the modulated carriers at respective times, in order to obtain a first and second received transmission symbol, and
a processor for using the two received transmission symbols, in order to determine the information symbol on which the two received transmission symbols are based, by ascertaining to which information symbol from the information symbols the first received transmission symbol and the second received transmission symbol being different from the first received transmission symbol are allocated, by using the signal constellation diagram.

28. Apparatus in accordance with claim 27, in which the processor further comprises:
a differential decoder for forming a phase difference between two successive demodulated received transmission symbols following each other in time.

29. Apparatus in accordance with claim 28, in which the differential decoder includes a multiplier, a delayer, and a former for forming a conjugated complex value.

30. Apparatus in accordance with claim 28, in which the processor furthermore comprises:
a calculator for calculating the Log-Likelihood Ratios for multiplication results, and
a combiner for combining the Log-Likelihood Ratios for the multiplication results, which relate to the two received transmission symbols, in order to obtain the information symbol.

31. Apparatus in accordance with claim 30, in which the combiner is arranged so as to add the Log-Likelihood Ratios based on the first and second received transmission symbols, wherein the apparatus furthermore comprises:
a channel decoder, which includes a Viterbi decoder.

32. Apparatus in accordance with claim 27, in which an information symbol is transmitted via a difference between the first symbol and the transmission symbol preceding it in time, and via a difference between the second transmission symbol and the transmission symbol preceding this in time, the apparatus furthermore comprising:
an estimator for estimating the phase of each received transmission symbol, and
a difference former for forming the difference between the phase of the received transmission symbol and the phase of the received transmission symbol before this, in order to obtain a received phase difference value for each transmission symbol.

33. Apparatus in accordance with claim 32, in which the processor furthermore comprises:
a soft decider for obtaining the information symbol via a soft decision, based on the received phase difference value, by means of a Viterbi algorithm.

34. Apparatus in accordance with claim 32, in which the processor furthermore comprises:
a threshold decider for obtaining the information symbol for comparing the received phase difference values for the first and second received transmission symbols, with a hard threshold, and
a result combiner for combining the results of the threshold deciding means for the first and second received transmission symbols, in order to obtain the information symbol.

35. Apparatus for the reception of information symbols, which are transmitted by means of a plurality of carriers, wherein an information symbol is represented by a first and a second transmission symbol, each being different from the other, which are received at different times, comprising:
a demodulator for demodulating the modulated carriers at respective times, in order to obtain a first and second received transmission symbol, and
a processor for using the two received transmission symbols, in order to determine the information symbol on which the two received transmission symbols are based, by ascertaining to which information symbol from the information symbols the first received transmission symbol and the second received transmission symbol being different from the first received transmission symbol are allocated, wherein the processor comprises a differential decoder for forming a phase difference between two successive demodulated received transmission symbols following each other in time.

* * * * *